US012804718B2

(12) United States Patent
Abotabl et al.

(10) Patent No.: US 12,804,718 B2
(45) Date of Patent: Nov. 17, 2026

(54) POWER INCREMENT CONTROL FOR DYNAMIC RANDOM ACCESS ADAPTATION

(71) Applicant: QUALCOMM Incorporated, San Diego, CA (US)

(72) Inventors: Ahmed Attia Abotabl, San Diego, CA (US); Nazmul Islam, Littleton, MA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 281 days.

(21) Appl. No.: 18/638,467

(22) Filed: Apr. 17, 2024

(65) Prior Publication Data

US 2025/0331025 A1 Oct. 23, 2025

(51) Int. Cl.

*H04W 74/0833* (2024.01)
*H04W 52/36* (2009.01)
*H04W 74/00* (2009.01)

(52) U.S. Cl.

CPC ....... *H04W 74/0833* (2013.01); *H04W 52/36* (2013.01); *H04W 74/006* (2013.01)

(58) Field of Classification Search

CPC ............. H04W 74/0833; H04W 52/36; H04W 74/006; H04W 52/146; H04W 52/325; H04W 52/362; H04W 52/48; H04W 74/004; H04W 52/50

See application file for complete search history.

(56) References Cited

U.S. PATENT DOCUMENTS

| | | | | |
|---|---|---|---|---|
| 2019/0313451 A1* | 10/2019 | Liu | ........................ | H04W 76/11 |
| 2022/0167429 A1* | 5/2022 | Shen | ................. | H04W 74/0833 |
| 2023/0209462 A1* | 6/2023 | Tsai | .................. | H04W 52/0235 370/311 |
| 2025/0159731 A1* | 5/2025 | Alfarhan | ........... | H04W 74/0808 |

FOREIGN PATENT DOCUMENTS

| | | |
|---|---|---|
| EP | 3528527 A1 | 8/2019 |
| WO | WO-2023014028 A1 | 2/2023 |

OTHER PUBLICATIONS

International Search Report and Written Opinion—PCT/US2025/021624—ISA/EPO—Jun. 26, 2025.

* cited by examiner

*Primary Examiner* — Abdullahi Ahmed
(74) *Attorney, Agent, or Firm* — QUALCOMM Incorporated

(57) ABSTRACT

Methods, systems, and devices for wireless communication are described. A user equipment (UE) may perform power ramping based on one or more skipped random access channel (RACH) occasions (ROs). The UE may receive an indication of a dynamic adaptation and one or more ROs to skip from a network entity, and may increment a transmission power based on the skipped ROs during one or more next ROs. In some examples, the UE may increase a transmission power based on one or more skipped message transmissions or based on each skipped RO regardless of UE transmissions. The UE may also utilize a same counter and a same increment for both retransmissions after failures and for skipped ROs, or a dedicated counter and increment for skipped ROs. One or more same or dedicated maximum counter limits may also be used for power control for failed transmissions and skipped ROs.

20 Claims, 11 Drawing Sheets

POWER INCREMENT CONTROL FOR DYNAMIC RANDOM ACCESS ADAPTATION

FIELD OF TECHNOLOGY

The following relates to wireless communication, including power increment control for dynamic random access adaptation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support power increment control for dynamic random access adaptation. For example, the described techniques provide for performing power ramping at a user equipment (UE) based on one or more skipped random access channel (RACH) occasions (ROs). For example, a UE may adapt RACH power control based on one or more skipped ROs when performing random access with a network supporting dynamic adaptation of RACH configurations. In some cases, a UE may receive an indication of a dynamic adaptation and one or more ROs to skip and may increment a transmission power based on the skipping during one or more next ROs. In some examples, the UE may increase a transmission power based on one or more skipped message transmissions or based on each skipped RO regardless of the UE skipping transmission within one or more ROs. The UE may also utilize a same counter (e.g., power ramping counter) and a same increment (e.g., power control increment, power increment step, power ramping step) for both retransmissions after failures and for skipped ROs, or a dedicated counter and increment for skipped ROs. One or more same or dedicated maximum counter limits may also be used for power control.

A method for wireless communications by a user equipment (UE) is described. The method may include receiving a control message indicating a set of multiple random access occasions associated with a random access procedure, receiving an indication to skip a quantity of one or more random access occasions of the set of multiple random access occasions, and transmitting a random access message during a random access occasion of the set of multiple random access occasions in accordance with a transmission power level, the transmission power level being based on the quantity of one or more skipped random access occasions.

A UE for wireless communications is described. The UE may include one or more memories storing processor executable code, and one or more processors coupled with the one or more memories. The one or more processors may individually or collectively be operable to execute the code to cause the UE to receive a control message indicating a set of multiple random access occasions associated with a random access procedure, receive an indication to skip a quantity of one or more random access occasions of the set of multiple random access occasions, and transmit a random access message during a random access occasion of the set of multiple random access occasions in accordance with a transmission power level, the transmission power level being based on the quantity of one or more skipped random access occasions.

Another UE for wireless communications is described. The UE may include means for receiving a control message indicating a set of multiple random access occasions associated with a random access procedure, means for receiving an indication to skip a quantity of one or more random access occasions of the set of multiple random access occasions, and means for transmitting a random access message during a random access occasion of the set of multiple random access occasions in accordance with a transmission power level, the transmission power level being based on the quantity of one or more skipped random access occasions.

A non-transitory computer-readable medium storing code for wireless communications is described. The code may include instructions executable by one or more processors to receive a control message indicating a set of multiple random access occasions associated with a random access procedure, receive an indication to skip a quantity of one or more random access occasions of the set of multiple random access occasions, and transmit a random access message during a random access occasion of the set of multiple random access occasions in accordance with a transmission power level, the transmission power level being based on the quantity of one or more skipped random access occasions.

In some examples of the method, user equipment (UEs), and non-transitory computer-readable medium described herein, the transmission power level may be based on a value of a power ramping counter and a power ramping increment and the value of the power ramping counter may be based on the quantity of one or more skipped random access occasions.

Some examples of the method, user equipment (UEs), and non-transitory computer-readable medium described herein may further include operations, features, means, or instructions for receiving an indication of a defined counter value associated with the power ramping counter and receiving an indication of the power ramping increment.

Some examples of the method, user equipment (UEs), and non-transitory computer-readable medium described herein may further include operations, features, means, or instructions for terminating the random access procedure based on the value of the power ramping counter satisfying or exceeding a defined value.

Some examples of the method, user equipment (UEs), and non-transitory computer-readable medium described herein may further include operations, features, means, or instructions for incrementing the power ramping counter based on the quantity of one or more skipped random access occasions.

Some examples of the method, user equipment (UEs), and non-transitory computer-readable medium described herein may further include operations, features, means, or instructions for incrementing a second power ramping counter different from a first power ramping counter based on the quantity of one or more skipped random access occasions, where the transmission power level may be based on a value of the second power ramping counter and a second power ramping increment, the second power ramping increment being different from a first power ramping increment associated with the first power ramping counter.

Some examples of the method, user equipment (UEs), and non-transitory computer-readable medium described herein may further include operations, features, means, or instructions for receiving an indication of a first defined counter value associated with the first power ramping counter and a second defined counter value associated with the second power ramping counter and receiving an indication of the first power ramping increment and the second power ramping increment.

Some examples of the method, user equipment (UEs), and non-transitory computer-readable medium described herein may further include operations, features, means, or instructions for replacing a second value of the second power ramping counter with a defined value based on the second value of the second power ramping counter satisfying or exceeding the defined value.

In some examples of the method, user equipment (UEs), and non-transitory computer-readable medium described herein, the transmission power level may be greater than a previous transmission power level based at least in part on a transmission during a random access occasion being skipped.

DETAILED DESCRIPTION

Figure 1:
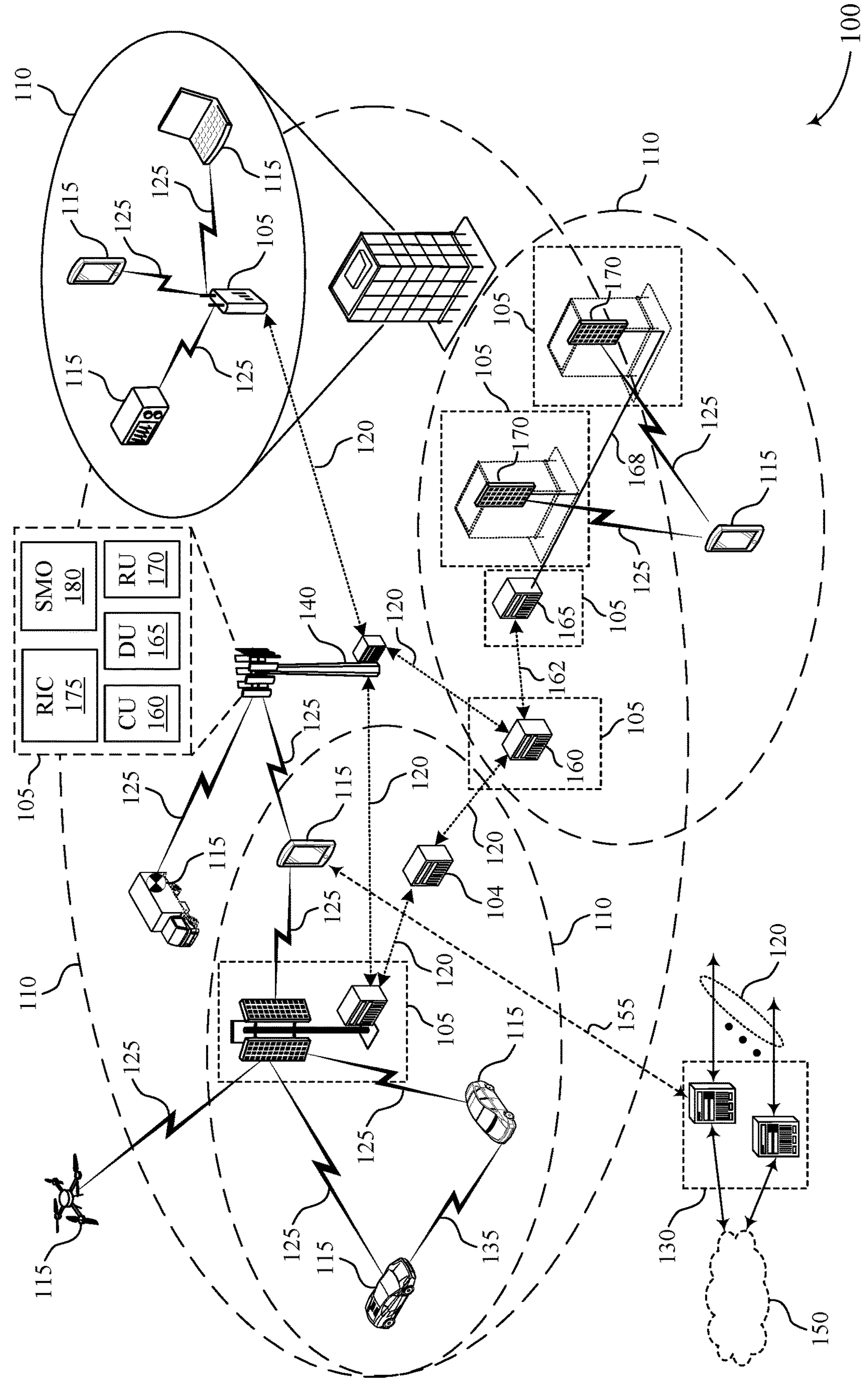
FIG. 1 shows an example of a wireless communications system that supports power increment control for dynamic random access adaptation in accordance with one or more aspects of the present disclosure.

Some wireless communications systems may support dynamic adaptation of random access configurations for network energy saving by muting (e.g., removing, rendering invalid, skipping) one or more random access channel (RACH) occasions (ROs), including physical RACH (PRACH) occasions. However, dynamic RACH adaptation may cause increased latency at a UE, for example, as a UE that is able to transmit during a skipped RO may instead wait to transmit until a next available RO. UEs may also support uplink power control for RACH procedures, including power ramping with a power increment for each respective retransmission of a message to increase a chance of successful connection with a network. However, a UE does not conventionally perform power ramping for skipped ROs due to RACH adaptation, which may introduce additional latency in communications, even for UEs without transmissions available during the skipped ROs, due to delayed power ramping procedures.

Techniques described herein enable may enable a UE to perform power ramping based on one or more skipped ROs in RACH. For example, a UE may adapt RACH power control based on one or more skipped ROs when performing RACH with a dynamic RACH adaptation supporting network. In some cases, a UE may receive an indication of a dynamic adaptation and one or more ROs to skip. For an occasion following the skipped occasions, the UE may ramp a transmission power based on the skipping. In some examples, the UE may increase a transmission power based on skipped ROs in which the UE was able to transmit a message or for each skipped RO regardless of UE transmissions. For power control, the UE may utilize a same counter (e.g., power ramping counter) and a same increment (e.g., power control increment, power increment step, power ramping step) for both retransmissions after failures and for skipped ROs, or may use a dedicated counter and increment for skipped occasions. The UE may in some cases use a same maximum counter limit for both retransmissions and skipped ROs, and may increase a maximum counter limit for each skipped occasion. Additionally, or alternatively, the UE may use a dedicated maximum counter limit for skipped ROs, which may in some examples replace a counter value if a counter exceeds the limit. By enabling power control based on skipped ROs, a UE may increase an efficiency in communications by providing addition opportunities for power ramping to reduce a chance of failed transmissions, among other advantages.

Aspects of the disclosure are initially described in the context of wireless communications systems. Aspects of the disclosure are further illustrated by and described with reference to wireless communications systems, power ramping diagrams, and process flows that relate to power increment control for dynamic random access adaptation. Aspects of the disclosure are further illustrated by and described with reference to apparatus diagrams, system diagrams, and flowcharts that relate to power increment control for dynamic random access adaptation.

FIG. 1 shows an example of a wireless communications system 100 that supports power increment control for dynamic random access adaptation in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaptation protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_S=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID)). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5 GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 may include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may also support dynamic adaptation of random access configurations for network energy at one or more network entities 105. For example, a network entity 105 may support dynamic power adaptation of a RACH (e.g., PRACH) configuration for energy power saving by muting, or skipping, one or more ROs of a random access procedure. UEs 115 in communication with one or more network entities 105 may further support uplink power control for RACH procedures, including power ramping. However, power ramping may not involve skipped ROs due to RACH adaptation at a network entity 105, which may introduce additional latency in communications due to delayed power ramping procedures.

As described herein, a UE 115 may support skipping rules of power ramping on ROs when dynamic PRACH is applied. For example, a UE 115 may adapt RACH power control based on one or more skipped ROs when performing random access with a network entity 105 supporting dynamic RACH adaptation. In some cases, a UE 115 may receive an indication of a dynamic adaptation and one or more skipped ROs. For an RO following the skipped occasions, the UE may be operable to ramp a transmission power based on the skipped ROs using a counter (e.g., power ramping counter) and an increment (e.g., power control increment, power increment step, power ramping step).

Figure 2:
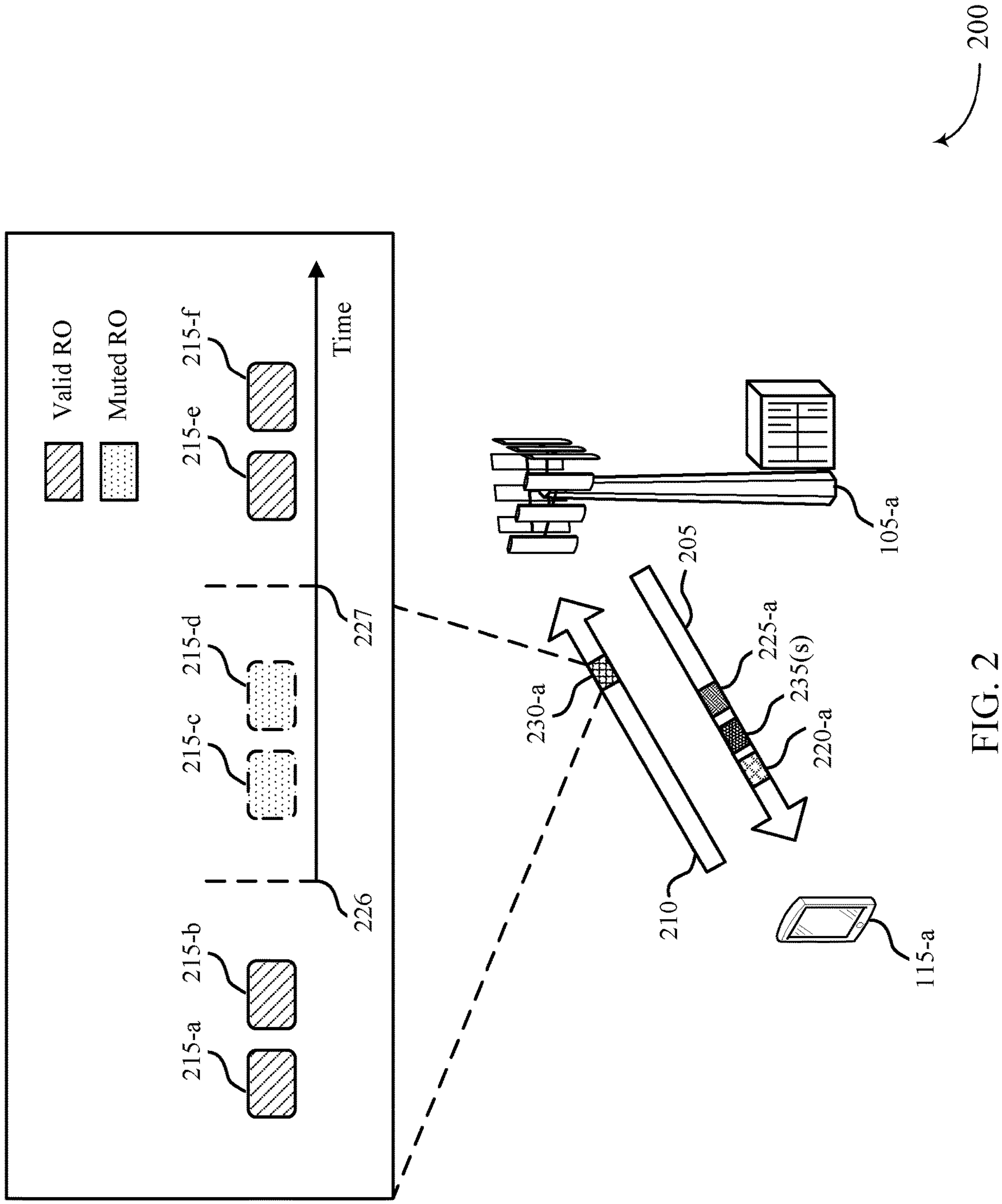
FIG. 2 shows an example of a wireless communications system that supports power increment control for dynamic random access adaptation in accordance with one or more aspects of the present disclosure.

FIG. 2 shows an example of a wireless communications system 200 that supports power increment control for dynamic random access adaptation in accordance with one or more aspects of the present disclosure. In some examples, the wireless communications system 200 may implement or be implemented by aspects of the wireless communications system 100. For example, the wireless communications system 200 may include a network entity 105-*a* that may be in communication with one or more UEs 115, including a UE 115-*a*. The UE 115-*a* may include a downlink communication link 205 and an uplink communication link 210 with the network entity 105-*a*. In some cases, the UE 115-*a* may support RACH power increment control for power ramping under dynamic RACH adaptation of the network entity 105-*a*.

For example, the network entity 105-*b* may support network energy saving using dynamic adaptation of RACH (e.g., PRACH) in the time domain. Dynamic adaptation of a PRACH configuration may result in network energy saving by muting one or more PRACH occasions, which may allow the network entity 105-*a* to enter a power saving mode, such as a deep sleep mode. However, PRACH adaptation may cause increased latency at the UE 115-*a* as the UE 115-*a* may wait for a longer duration (e.g., than would otherwise be present) until a next available RO for transmission. Additionally, or alternatively, uplink power control for PRACH at the UE 115-*a* may include a power increment for each retransmission to increase a chance of successful connection to the network entity 105-*a* and associated network. For example, during a PRACH procedure, the UE 115-*a* may select an RO for transmission and transmit a PRACH preamble, or Msg1, according to a first transmission power. If the UE 115-*a* fails to receive a Msg2 (e.g., a random access response) in response, the UE 115-*a* may retransmit the Msg1 with a next power according to an increment (e.g., at an increased power level). The UE 115-*a* may in some cases continue to retransmit during ROs while incrementing the power in each retransmission until a connection is successfully established.

In some examples, a transmission power for a PRACH preamble (e.g., Msg1) may be based on a PRACH target reception power, PRAMBLE_RECEVEID_TARGET_POWER, which may be set according to different increments according to Equation 1 below:

$$\begin{aligned}\text{PRAMBLE\_RECEIVED\_TARGET\_POWER} &= \mathit{preambleReceivedTargetPower} \\ &+\text{DELTA\_PREAMBLE} \\ &+(\text{PREAMBLE\_POWER\_RAMPING\_COUNTER} \\ &-1)\times\text{PREAMBLE\_POWER\_RAMPING\_STEP} \\ &-\text{POWER\_OFFSET\_2STEP\_RA}\end{aligned} \tag{1}$$

Notably, preambleReceivedTargetPower may represent an initial transmission power with which the UE 115-*a* may start based on a configuration, while PREAMBLE_POWER_RAMPING_COUNTER may be incremented after each failed transmission to increase a next transmission power by a power ramping increment of PREAMBLE_POWER_RAMPING_STEP. In some cases, values used in Equation 1 including related boundaries, starting values, and offsets, may be defined previously by signaling, such as in an RRC message to the UE 115-*a*. Further, while Equation 1 may be an example of power ramping for 2-step RACH, similar procedures and equations may apply to 4-step RACH as well as other types of RACH.

In some examples, the network entity 105-*a* and the UE 115-*a* may support dynamic RACH adaptation. For example, the network entity 105-*a* may configure the UE 115-*a* with a quantity of ROs 215, including ROs 215-*a*, 215-*b*, 215-*c*, 215-*d*, 215-*e*, and 215-*f*, for transmitting one or more RACH messages during a RACH procedure. The network entity 105-*a* may indicate to the UE 115-*a* a dynamic adaptation of a RACH configuration, which may include muting (e.g., rendering invalid, removing) ROs 215-*c* and 215-*d*. For example, the network entity 105-*a* may enter a deep sleep mode during the ROs 215-*c* and 215-*d*, during which the UE 115-*a* may no longer be able to transmit. In some cases, under dynamic adaptation of the PRACH configuration, if the UE 115-*a* does not transmit in an RO that was previously valid but now after the adaptation becomes invalid, such as the ROs 215-*c* and 215-*d*, the UE 115-*a* may wait until a following available RO, such as the RO 215-*e* (e.g., a valid RO during which the UE 115-*a* may transmit), to transmit a next RACH message, increasing a latency in communications.

A delay in a RACH transmission due to dynamic RACH adaptation may, from a latency perspective, be similar to a failure of one or more transmissions. For example, the UE 115-*a* may transmit a Msg1 at 215-*e* instead of at 215-*c* due to either skipping the RO 215-*c*, or due to a failed transmission at 215-*c*, resulting in a similar delay. However, although some UEs 115 may be configured to perform power ramping due to failed transmissions, some UEs 115 may lack procedures for incorporating dynamic PRACH power adaptation and skipped ROs into power ramping. Further, although some network entities 105 may indicate to skip one or more ROs, some network entities 105 may not indicate any power adjustment updates (e.g., new ramping increment values) based on the skipped occasions. Thus, there may be opportunities for additional definitions of power ramping for dynamic PRACH adaptation, in which power control may consider whether a UE 115 may increment a transmission power with each delay in RACH transmissions due to dynamic adaptation as well as failed transmissions.

As discussed herein, the UE 115-*a* may support uplink power control under dynamic RACH adaptation including additional power ramping procedures based on one or more skipped ROs. For example, the UE 115-*a* may receive a control message 220, such as a control message 220-*a* (e.g., an RRC message), that may indicate a set of ROs 215 associated with a RACH procedure. The network entity 105-*a* may determine to enter a deep sleep mode and may transmit an indication 225, such as an indication 225-*a*, to the UE 115-*a* that may indicate to skip transmission during the ROs 215-*c* and 215-*d*. Based on the indication, the UE 115-*a* may skip transmission during the ROs 215-*c* and 215-*d*.

For example, at 226, the UE 115-*a*, when attempting random access with the network entity 105-*a*, may skip the ROs 215-*c* and 215-*d* (e.g., as the UE 115-*a* may be unable to transmit), and may wait until the RO 215-*e* to transmit a message 230, such as a message 230-*a* (e.g., a random access message, a Msg1). The UE 115-*a* may transmit the message 230-*a* in accordance with a transmission power level based on the skipped ROs 215-*c* and 215-*d* (e.g., UE transmits with a power increment compared to a first transmission that is skipped due to the skipped ROs). In other words, the UE 115-*a* may increase a transmission power level for transmission of the message 230-*a* in RO 215-*e* as if the UE 115-*a* had transmitted in skipped ROs 215-*c* and 215-*d*. In some cases, the UE 115-*a* may increment a power ramping counter based on one or more of the skipped ROs, where the transmission power may be based on a power increment and the incremented counter. Additionally, or alternatively, the UE 115-*a* may receive one or more indications 235 of one or more counters, increments, or counter limits, among other indications 235. In some cases, for a UE 115 performing random access to a network performing dynamic PRACH adaptation, the UE 115 may increment a RACH uplink transmission power for each RO 215 that was existing in a baseline configuration but was removed or muted due to the dynamic PRACH adaptation. For example, the UE 115-*a* may increment a counter (e.g., a same counter as used for failed transmissions, a dedicated counter) twice for the two skipped ROs 215-*c* and 215-*d*, or a single time for a pair of skipped ROs.

Additionally, or alternatively, a UE 115 may increment a RACH uplink transmission power based on whether the UE 115 had any messages to transmit. For example, if the UE 115-*a* does not have any messages to transmit during the RO 215-*c* and the RO 215-*d* (e.g., if PRACH is not initiated until 227 or if a Msg1 may not yet be ready to send at the RO 215-*c* or the RO 215-*d*), the UE 115-*a* may transmit the message 230-*a* during the RO 215-*e* using a baseline transmission power. The network entity 105-*a* may also refrain from notifying the UE 115-*a* of the skipped occasions, and the UE 115-*a* may attempt to transmit during the ROs 215-*c* and 215-*d*, and may increment a transmission power accordingly after failing to receive a response from the network entity 105-*a*.

A power increment may in some examples be proportional to a time elapsed between ROs. For example, a quantity of ROs 215 may include a first quantity of increments of a first power size in a duration of time, while a smaller quantity of ROs 215 may include a smaller quantity of relatively larger power size increments during the same duration, so that a same final increment or maximum increment value is associated with both quantities of ROs. By ramping the power, the UE 115-*a* may be able to account for missed ROs, which may provide additional opportunities for power ramping that the UE 115-*a* may otherwise not have (e.g., as the UE 115-*a* may not have experienced a failed transmission). Ramping power based on skipped ROs 215 may thus increase a chance that one or more messages are received successfully at the network entity 105-*a*.

Figure 3:
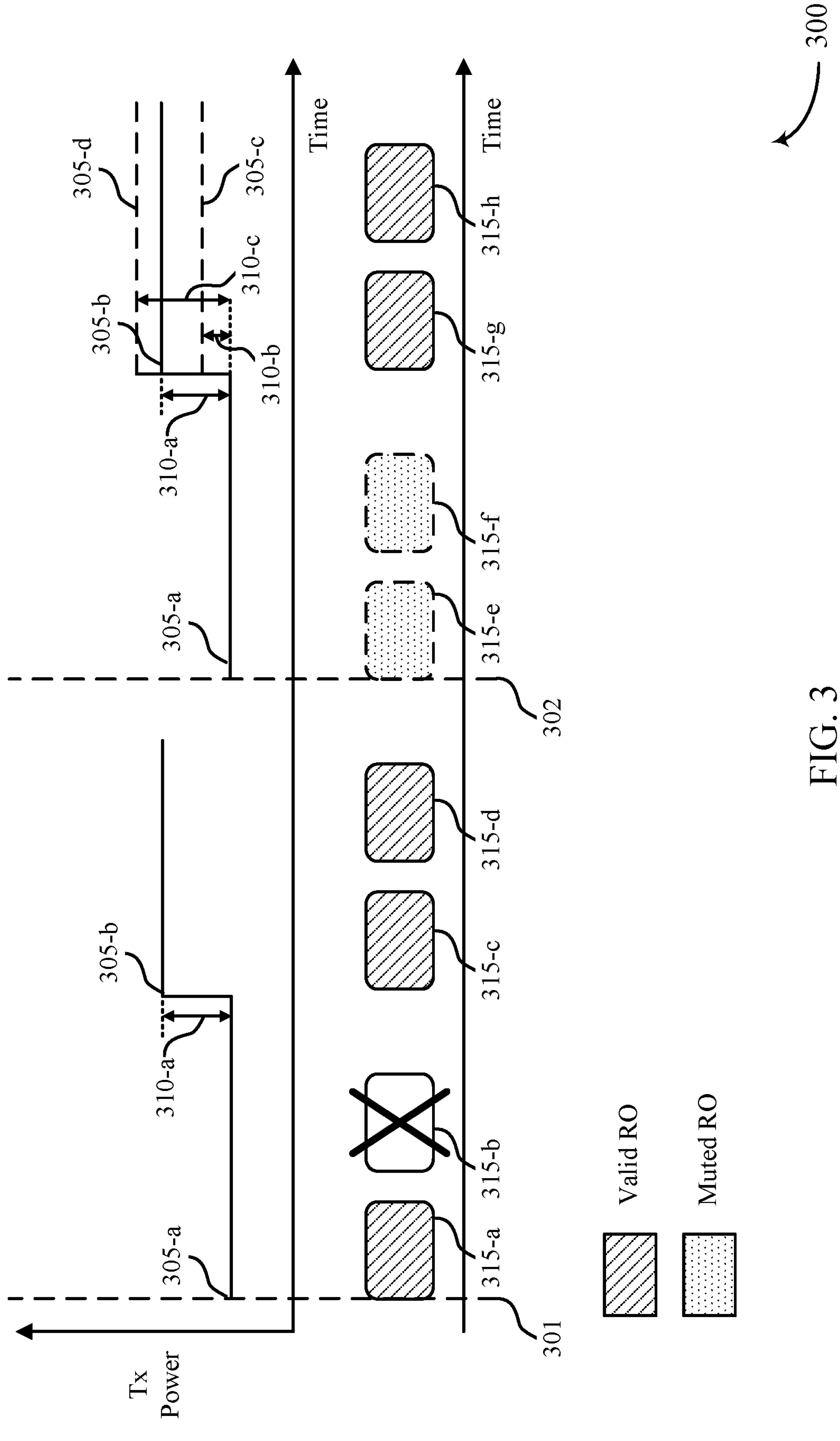
FIG. 3 shows an example of a power ramping diagram that supports power increment control for dynamic random access adaptation in accordance with one or more aspects of the present disclosure.

FIG. 3 show examples of power ramping diagram 300 that supports power increment control for dynamic random access adaptation in accordance with one or more aspects of the present disclosure. In some examples, power ramping diagram 300 may implement or be implemented by aspects of the wireless communications system 100 and the wireless communications system 200. For example, the power ramping diagram 300 may illustrate power control procedures including power ramping for RACH (e.g., PRACH) transmissions from the UE 115-*a* to the network entity 105-*a* during ROs 315, which may be examples of the ROs 215. As described herein, uplink power control for failed messages may include a counter PREAMBLE_POWER_RAMPING_COUNTER for a quantity of attempts of a Msg1 that may control a power increment for transmissions. In some cases, a power increment for skipped ROs 315 may be the same as the power increment for failed transmissions, or may be different.

For example, a UE 115 may apply a same power ramping increment (e.g., power control increment) for both failed transmissions and for power control based on skipped ROs. The UE 115-*a* may perform power ramping in both cases in accordance with Equation 1 described herein by incrementing the counter PREAMBLE_POWER_RAMPING_COUNTER and using an increment PREAMBLE_POWER_RAMPING_STEP.

For example, the UE 115-*a* may be configured with ROs 315-*a*, 315-*b*, 315-*c*, 315-*d*, 315-*e*, 315-*f*, 315-*g*, and 315-*h* (e.g., one or more valid and muted ROs). During a first RACH procedure, the UE 115-*a* may initialize random access at 301 and may select the RO 315-*b* and attempt to transmit a Msg1 during the RO 315-*b* in accordance with a transmission power 305, such as an initial transmission power 305-*a*. In some cases, the UE 115-*a* may determine that the Msg1 transmission failed due to a lack of a Msg2 response (e.g., random access response message), and may increment the counter PREAMBLE_POWER_RAMPING_COUNTER by 1 for the failed transmission.

The UE 115-*a* may retransmit the Msg1 at a next RO 315-*c* (e.g., a next available RO, an RO selected from one or more next available ROs). The retransmission may be transmitted in accordance with a second transmission power 305-*b* with a power difference 310-*a* that may be based on Equation 1 including the incremented counter and the power ramping increment (e.g., step value). During a second RACH procedure initiated at 302 and involving dynamic adaptation, the network entity 105-*a* may indicate to the UE 115-*a* to skip the ROs 315-*e* and 315-*f* (e.g., repeats of the ROs 315-*a* and 315-*b*). Based on the skipped ROs 315, the UE 115-*a* may transmit a Msg1 for the second RACH procedure during the RO 315-*g* in accordance with the second transmission power 305-*b* after resetting the counter for the new RACH procedure and incrementing the counter based on the skipped occasions, and by using the same power ramping increment.

In some examples, as described herein, the UE 115-*a* may increment the counter for each RO that the UE 115-*a* skips due to dynamic adaptation of RACH configuration, even if the UE does not transmit any messages or indications (e.g., may transmit based on ROs in which the UE would have transmitted and not increment a power if there was nothing to transmit, or may increment a power for each skipped RO regardless of whether the UE had anything to transmit). There may be two different alternatives for a counter limit (e.g., maximum, threshold). In some cases, the UE 115-*a* may keep a same counter maximum limit that is used for failed transmissions to also declare failure of RACH (e.g., PRACH) involving skipped ROs 315. Additionally, or alternatively, the UE 115-*a* may increment a maximum counter limit by 1 each time the UE 115-*a* increments the counter due to a skipped RO based on dynamic PRACH adaptation, which may allow the UE 115-*a* to avoid reaching the maximum limit before ever attempting a transmission.

In some examples, the power ramping increment (e.g., PREAMBLE_POWER_RAMPING_COUNTER), a maximum counter limit, or both, may be indicated by one or more indications 235 described with respect to FIG. 2 (e.g., a System Information Block Type 1 (SIB1)). Using a same counter and increment for both cases may in some cases result in a relatively simple uplink power control modification and control, reducing a level of additional processing at the UE 115-*a* and the network entity 105-*a*. In some examples, the UE 115-*a* may increment the counter for every skipped RO due to dynamic adaptation of RACH configuration, even for ROs where the UE 115-*a* does not transmit anything (e.g., increment once for a single skipped RO, twice for two skipped ROs, and so forth). In some cases, the UE 115-*a* may keep the same counter maximum limit to declare failure of PRACH (e.g., declare RACH failure once the UE reaches the counter maximum limit without successful establishing connectivity). In some other cases, the UE 115-*a* may increment the maximum counter limit by 1 each time the UE 115-*a* increments the counter due to a skipped RO due to dynamic PRACH adaptation.

By way of another example, the UE 115-*a* may apply a separate counter and a separate increment for power control when skipping ROs 315 under dynamic RACH adaptation. For example, the network, via the network entity 105-*a*, may indicate another power increment step PREAMBLE_POWER_RAMPING_SKIPPED_RO_STEP, that may be used for skipped ROs 315, via one or more indications 235. The UE 115-*a* may also maintain another counter for the skipped ROs, PREAMBLE_POWER_RAMPING_SKIPPED_RO_COUNTER, with a maximum counter value that may also be indicated by the network in an indication 235 (e.g., in system information via an SIB1). Uplink power control for PRACH under dynamic adaptation may be given by Equation 2 below:

$$\begin{aligned}\text{PREAMBLE\_RECEIVED\_TARGET\_POWER} &= \textit{preambleReceivedTargetPower} + \text{DELTA\_PREAMBLE} \\ &+ (\text{PREAMBLE\_POWER\_RAMPING\_COUNTER} \\ &- 1) \times \text{PREAMBLE\_POWER\_RAMPING\_STEP} \\ &- \text{POWER\_OFFSET\_2STEP\_RA} \\ &- (\text{PREAMBLE\_POWER\_RAMPING\_SKIPPED\_RO\_COUNTER} \\ &- 1) \times (\text{PREAMBLE\_POWER\_RAMPING\_SKIPPED\_RO\_STEP}\end{aligned} \quad (2)$$

Similar equations and applications may also apply to 4-Step RACH and other procedures. Notably, a power difference 310 may be based on the counter and ramping increment (e.g., step value) for failed transmissions as well as the counter and ramping increment for skipped ROs 315. For example, when there are no failed transmissions but a transmission power is based on skipping ROs 315-*e* and 315-*f*, a Msg1 may be transmitted in accordance with a transmission power 305-*c* after incrementing the counter PREAMBLE_POWER_RAMPING_SKIPPED_RO_COUNTER one or more times, which may be illustrated by a difference 310-*b* to an initial transmission power, which may be lower than the difference 310-*a* (e.g., if PREAMBLE_POWER_RAMPING_SKIPPED_RO_STEP<PREAMBLE_POWER_RAMPING_STEP. Additionally, or alternatively, if one or more transmissions fail and one or more ROs 315 are skipped, the UE 115-*a* may transmit a Msg1 (or other random access message) in accordance with a transmission power 305-*d* that may be illustrated by a power difference 310-*c*, which may represent an addition of the power difference 310-*a* and the power difference 310-*b* (or similar power incrementation based on both counters and both ramping increments).

In some cases, utilizing separate counters and separate ramping increments may provide a more flexible system compared to using a same counter and increment as doing so may allow a greater variety in transmission power values. For example, a system may associate failed transmissions with using a higher increment to increase chance of success, while skipped ROs may use a smaller increment if the larger increment is less useful for skipped ROs (e.g., in case a transmission power is already sufficient for successful transmission). Additionally, or alternatively, a separate maximum counter limit may be used for PREAMBLE_POWER_RAMPING_SKIPPED_RO_COUNTER. In some cases, if PREAMBLE_POWER_RAMPING_SKIPPED_RO_COUNTER satisfies (e.g., reaches, is equal to, exceeds or is greater than) the configured maximum counter limit, the counter may be replaced by a maximum value in Equation 2 (e.g., if the counter increases from 5 to 6 with a maximum limit of 5, the counter value of 6 may be replaced with 5 for transmission power calculation). Or the UE 115-*a* may halt incrementing of the counter once the maximum is satisfied.

Figure 4:
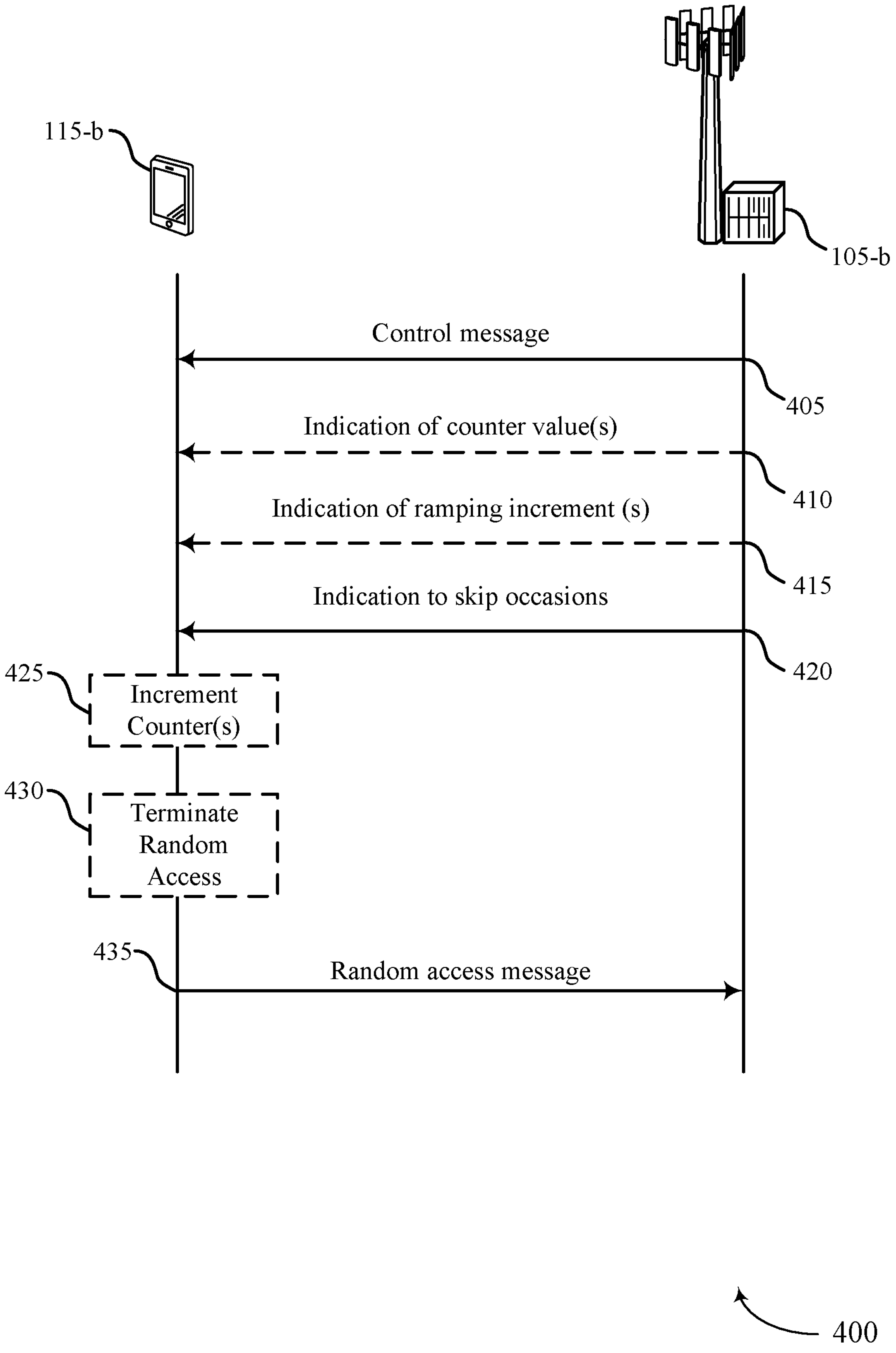
FIG. 4 shows an example of a process flow that supports power increment control for dynamic random access adaptation in accordance with one or more aspects of the present disclosure.

FIG. 4 shows an example of a process flow 400 that supports power increment control for dynamic random access adaptation in accordance with one or more aspects of the present disclosure. In some examples, the process flow 400 may implement or be implemented by aspects of the wireless communications systems 100 and 200 and the power ramping diagram 300. For example, the process flow 400 may include one or more UEs 115, including a UE 115-*b*, and one or more network entities 105, including a network entity 105-*b*, that may support power ramping based on skipped RACH occasions under dynamic RACH adaptation.

In the following description of the process flow 400, the operations may be performed (such as reported or provided) in a different order than the order shown, or the operations performed by the example devices may be performed in different orders or at different times. Some operations also may be omitted from the process flow 400, or other operations may be added to the process flow 400. Further, although some operations or signaling may be shown to occur at different times for discussion purposes, these operations may actually occur at the same time or at least partially concurrently.

At 405, the UE 115-*b* may receive (e.g., from the network entity 105-*b*) a control message (e.g., a control message 220) indicating a set of multiple random access occasions (e.g., ROs 215, ROs 315) associated with a random access procedure (e.g., a RACH procedure, a PRACH procedure).

At 410, the UE 115-*b* may optionally receive one or more indications associated with values for one or more counters (e.g., one or more indications 235). For example, the UE 115-*b* may receive an indication of a defined counter value (e.g., maximum counter limit) associated with a power ramping counter. The UE 115-*b* may in some cases receive an indication of a first defined counter value associated with the first power ramping counter (e.g., PREAMBLE_POWER_RAMPING_COUNTER) and a second defined counter value associated with a second power ramping counter (e.g., PREAMBLE_POWER_RAMPING_SKIPPED_RO_COUNTER).

At 415, the UE 115-*b* may optionally receive one or more indications of one or more ramping increments. For example, the UE 115-*b* may receive an indication of a single power ramping increment (e.g., PREAMBLE_POWER_RAMPING_STEP). Additionally, or alternatively, the UE 115-*b* may receive an indication of a first power ramping increment (e.g., PREAMBLE_POWER_RAMPING_STEP) and a second power ramping increment (e.g., PREAMBLE_POWER_RAMPING_SKIPPED_RO_STEP).

At 420, the UE 115-*b* may receive an indication (e.g., an indication 225) to skip a quantity of one or more random access occasions of the set of multiple random access occasions.

At 425, the UE 115-*b* may increment one or more counters, where a value of one or more counters may be based on the quantity of one or more skipped random access occasions. For example, the UE 115-*b* may increment the first power ramping counter based on the quantity of one or more skipped random access occasions. Additionally, or alternatively, the UE 115-*b* may increment the second power ramping counter, that may be different from the first power ramping counter, based on the quantity of one or more skipped random access occasions. The UE 115-*b* may also replace a second value of the second power ramping counter with a defined value (e.g., maximum counter limit) based on the second value of the second power ramping counter satisfying or exceeding the defined value.

At 430, the UE 115-*b* may terminate the random access procedure based on the value of a power ramping counter (e.g., the first power ramping counter, the second power ramping counter) satisfying or exceeding a defined value.

At 435, the UE 115-*b* may transmit a random access message (e.g., a message 230) during a random access occasion of the set of multiple random access occasions in accordance with a transmission power level. In some cases, the transmission power level may be based on the quantity of one or more skipped random access occasions. For example, the transmission power level may be based on a value of the first power ramping counter and the first power ramping increment. Additionally, or alternatively, the transmission power level may be based on a value of the second power ramping counter and the second power ramping increment, the second power ramping increment being different from the first power ramping increment associated with the first power ramping counter. In some cases, the transmission power level may be greater than a previous transmission power level based on a transmission during a random access occasion being skipped.

Figure 5:
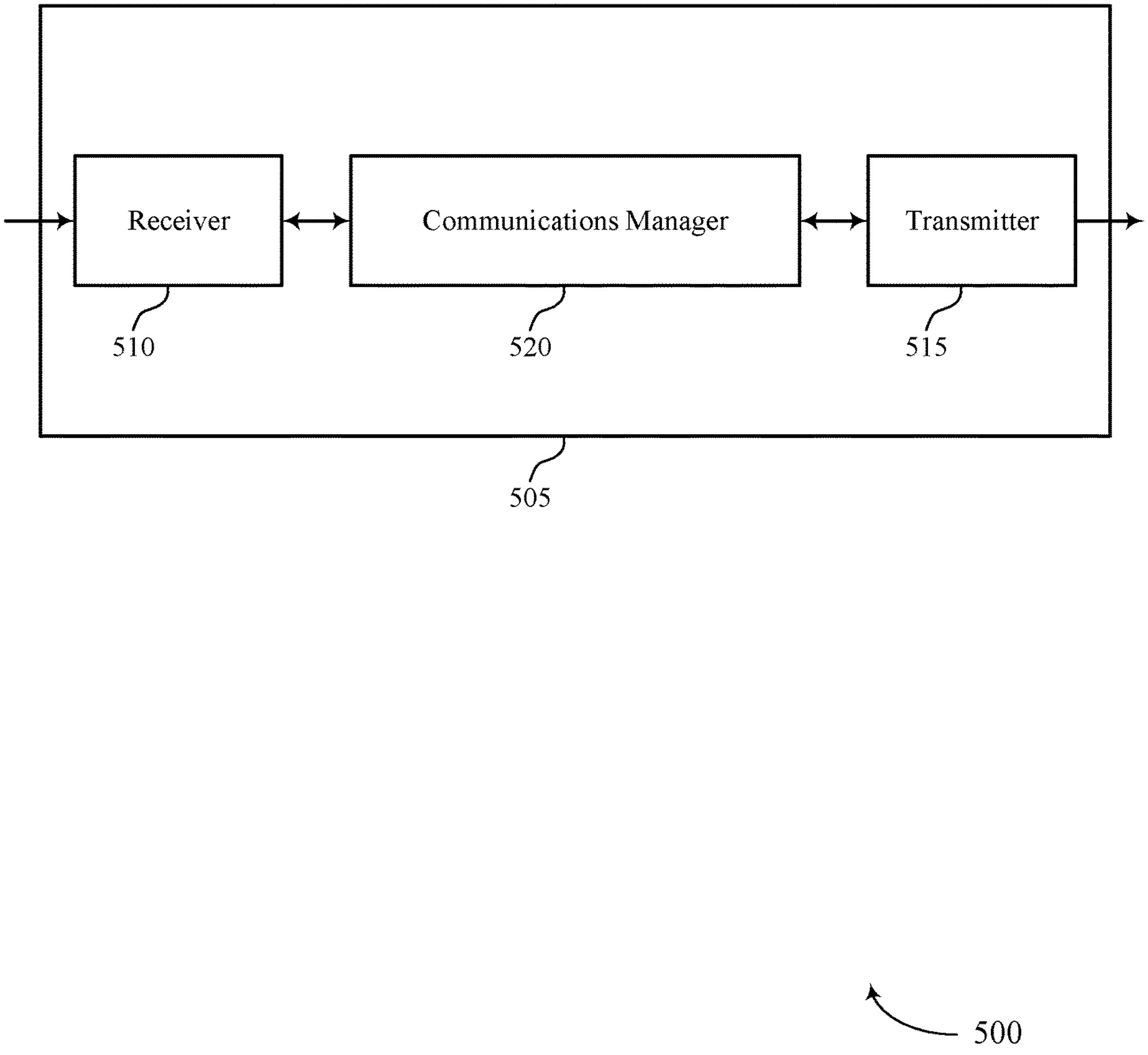
FIGS. 5 and 6 show block diagrams of devices that support power increment control for dynamic random access adaptation in accordance with one or more aspects of the present disclosure.

FIG. 5 shows a block diagram 500 of a device 505 that supports power increment control for dynamic random access adaptation in accordance with one or more aspects of the present disclosure. The device 505 may be an example of aspects of a UE 115 as described herein. The device 505 may include a receiver 510, a transmitter 515, and a communications manager 520. The device 505, or one or more components of the device 505 (e.g., the receiver 510, the transmitter 515, the communications manager 520), may include at least one processor, which may be coupled with at least one memory, to, individually or collectively, support or enable the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to power increment control for dynamic random access adaptation). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to power increment control for dynamic random access adaptation). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations or components thereof may be examples of means for performing various aspects of power increment control for dynamic random access adaptation as described herein. For example, the communications manager 520, the receiver 510, the transmitter 515, or various combinations or components thereof may be capable of performing one or more of the functions described herein.

In some examples, the communications manager 520, the receiver 510, the transmitter 515, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 520, the receiver 510, the transmitter 515, or various combinations or components thereof may be implemented in code (e.g., as communications management software or firmware) executed by at least one processor (e.g., referred to as a processor-executable code). If implemented in code executed by at least one processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. For example, the communications manager 520 is capable of, configured to, or operable to support a means for receiving a control message indicating a set of multiple random access occasions associated with a random access procedure. The communications manager 520 is capable of, configured to, or operable to support a means for receiving an indication to skip a quantity of one or more random access occasions of the set of multiple random access occasions. The communications manager 520 is capable of, configured to, or operable to support a means for transmitting a random access message during a random access occasion of the set of multiple random access occasions in accordance with a transmission power level, the transmission power level being based on the quantity of one or more skipped random access occasions.

By including or configuring the communications manager 520 in accordance with examples as described herein, the device 505 (e.g., at least one processor controlling or otherwise coupled with the receiver 510, the transmitter 515, the communications manager 520, or a combination thereof) may support techniques for reduced processing, reduced power consumption, and more efficient utilization of communication resources by enabling transmission power control based on skipped ROs, including same or dedicated counters, maximum counters limits, and increments for failed transmission power control and skipped RO power control.

Figure 6:
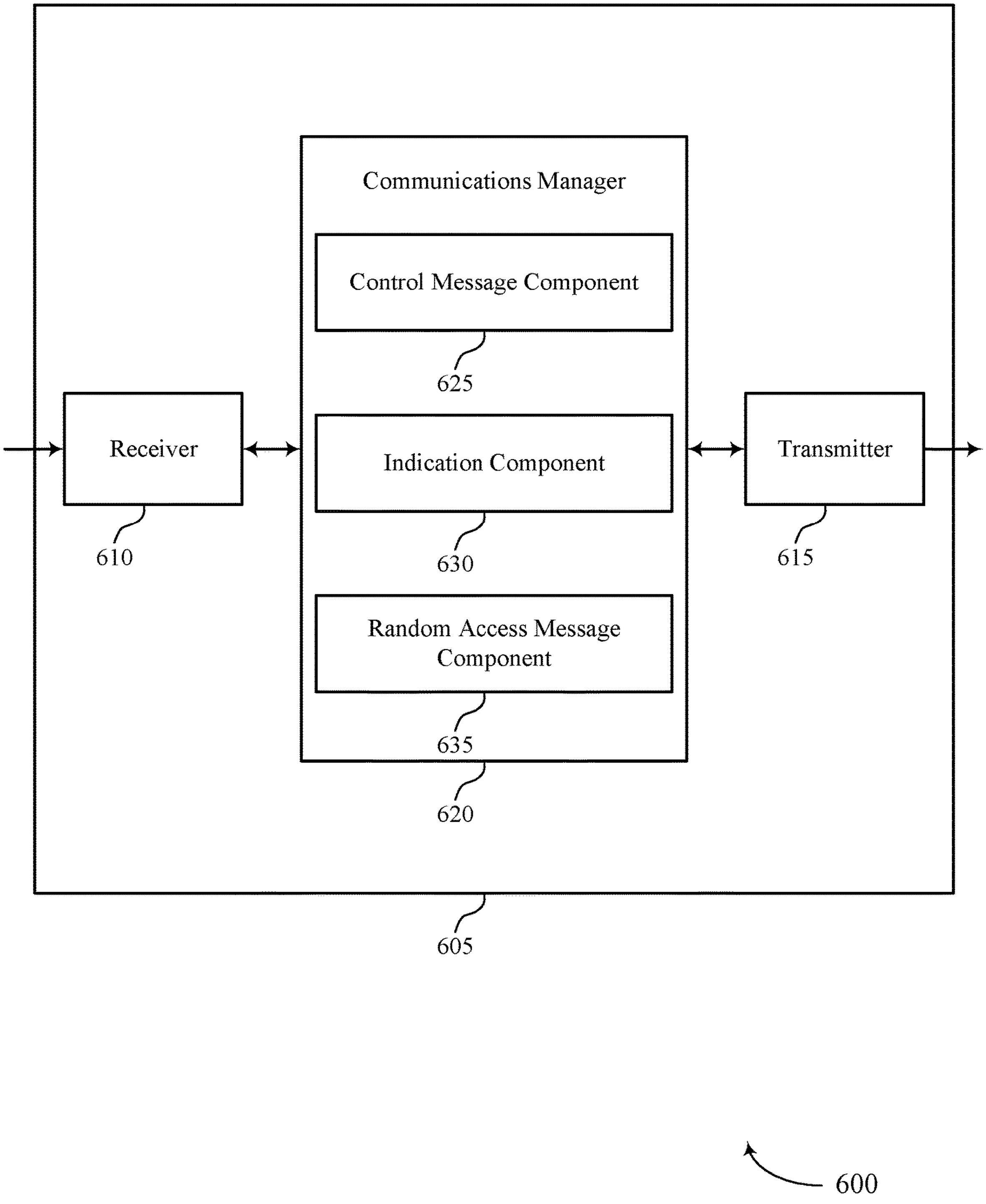

FIG. 6 shows a block diagram 600 of a device 605 that supports power increment control for dynamic random access adaptation in accordance with one or more aspects of the present disclosure. The device 605 may be an example of aspects of a device 505 or a UE 115 as described herein. The device 605 may include a receiver 610, a transmitter 615, and a communications manager 620. The device 605, or one or more components of the device 605 (e.g., the receiver 610, the transmitter 615, the communications manager 620), may include at least one processor, which may be coupled with at least one memory, to support the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to power increment control for dynamic random access adaptation). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to power increment control for dynamic random access adaptation). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of power increment control for dynamic random access adaptation as described herein. For example, the communications manager 620 may include a control message component 625, an indication component 630, a random access message component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. The control message component 625 is capable of, configured to, or operable to support a means for receiving a control message indicating a set of multiple random access occasions associated with a random access procedure. The indication component 630 is capable of, configured to, or operable to support a means for receiving an indication to skip a quantity of one or more random access occasions of the set of multiple random access occasions. The random access message component 635 is capable of, configured to, or operable to support a means for transmitting a random access message during a random access occasion of the set of multiple random access occasions in accordance with a transmission power level, the transmission power level being based on the quantity of one or more skipped random access occasions.

Figure 7:
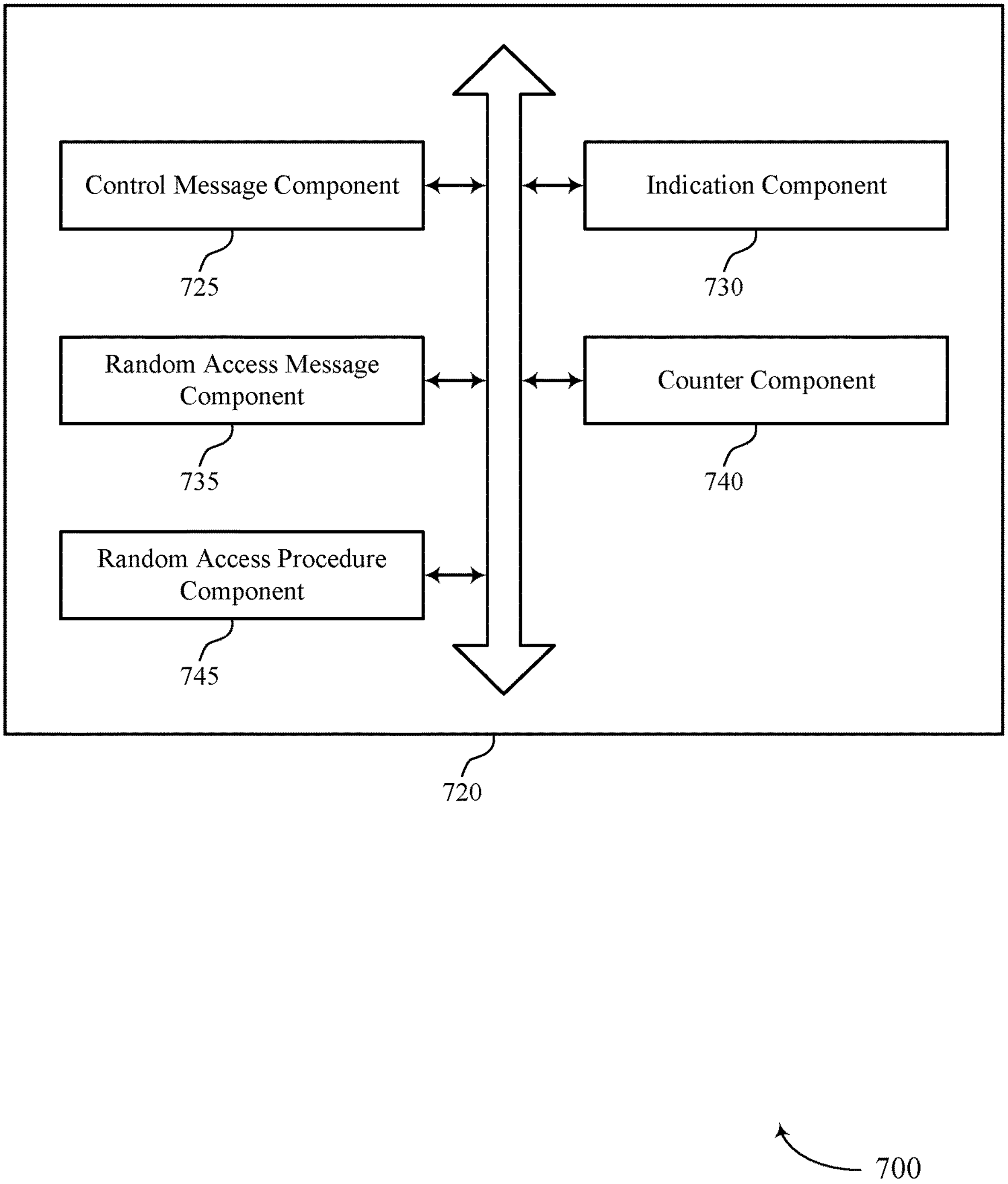
FIG. 7 shows a block diagram of a communications manager that supports power increment control for dynamic random access adaptation in accordance with one or more aspects of the present disclosure.

FIG. 7 shows a block diagram 700 of a communications manager 720 that supports power increment control for dynamic random access adaptation in accordance with one or more aspects of the present disclosure. The communications manager 720 may be an example of aspects of a communications manager 520, a communications manager 620, or both, as described herein. The communications manager 720, or various components thereof, may be an example of means for performing various aspects of power increment control for dynamic random access adaptation as described herein. For example, the communications manager 720 may include a control message component 725, an indication component 730, a random access message component 735, a counter component 740, a random access procedure component 745, or any combination thereof. Each of these components, or components or subcomponents thereof (e.g., one or more processors, one or more memories), may communicate, directly or indirectly, with one another (e.g., via one or more buses).

The communications manager 720 may support wireless communications in accordance with examples as disclosed herein. The control message component 725 is capable of, configured to, or operable to support a means for receiving a control message indicating a set of multiple random access occasions associated with a random access procedure. The indication component 730 is capable of, configured to, or operable to support a means for receiving an indication to skip a quantity of one or more random access occasions of the set of multiple random access occasions. The random access message component 735 is capable of, configured to, or operable to support a means for transmitting a random access message during a random access occasion of the set of multiple random access occasions in accordance with a transmission power level, the transmission power level being based on the quantity of one or more skipped random access occasions.

In some examples, the transmission power level is based on a value of a power ramping counter and a power ramping increment. In some examples, the value of the power ramping counter is based on the quantity of one or more skipped random access occasions.

In some examples, the indication component 730 is capable of, configured to, or operable to support a means for receiving an indication of a defined counter value associated with the power ramping counter. In some examples, the indication component 730 is capable of, configured to, or operable to support a means for receiving an indication of the power ramping increment.

In some examples, the random access procedure component 745 is capable of, configured to, or operable to support a means for terminating the random access procedure based on the value of the power ramping counter satisfying or exceeding a defined value.

In some examples, the counter component 740 is capable of, configured to, or operable to support a means for incrementing the power ramping counter based on the quantity of one or more skipped random access occasions.

In some examples, the counter component 740 is capable of, configured to, or operable to support a means for incrementing a second power ramping counter different from a first power ramping counter based on the quantity of one or more skipped random access occasions, where the transmission power level is based on a value of the second power ramping counter and a second power ramping increment, the second power ramping increment being different from a first power ramping increment associated with the first power ramping counter.

In some examples, the indication component 730 is capable of, configured to, or operable to support a means for receiving an indication of a first defined counter value associated with the first power ramping counter and a second defined counter value associated with the second power ramping counter. In some examples, the indication component 730 is capable of, configured to, or operable to support a means for receiving an indication of the first power ramping increment and the second power ramping increment.

In some examples, the counter component 740 is capable of, configured to, or operable to support a means for replacing a second value of the second power ramping counter with a defined value based on the second value of the second power ramping counter satisfying or exceeding the defined value.

In some examples, the transmission power level is greater than a previous transmission power level based at least in part on a transmission during a random access occasion being skipped.

Figure 8:
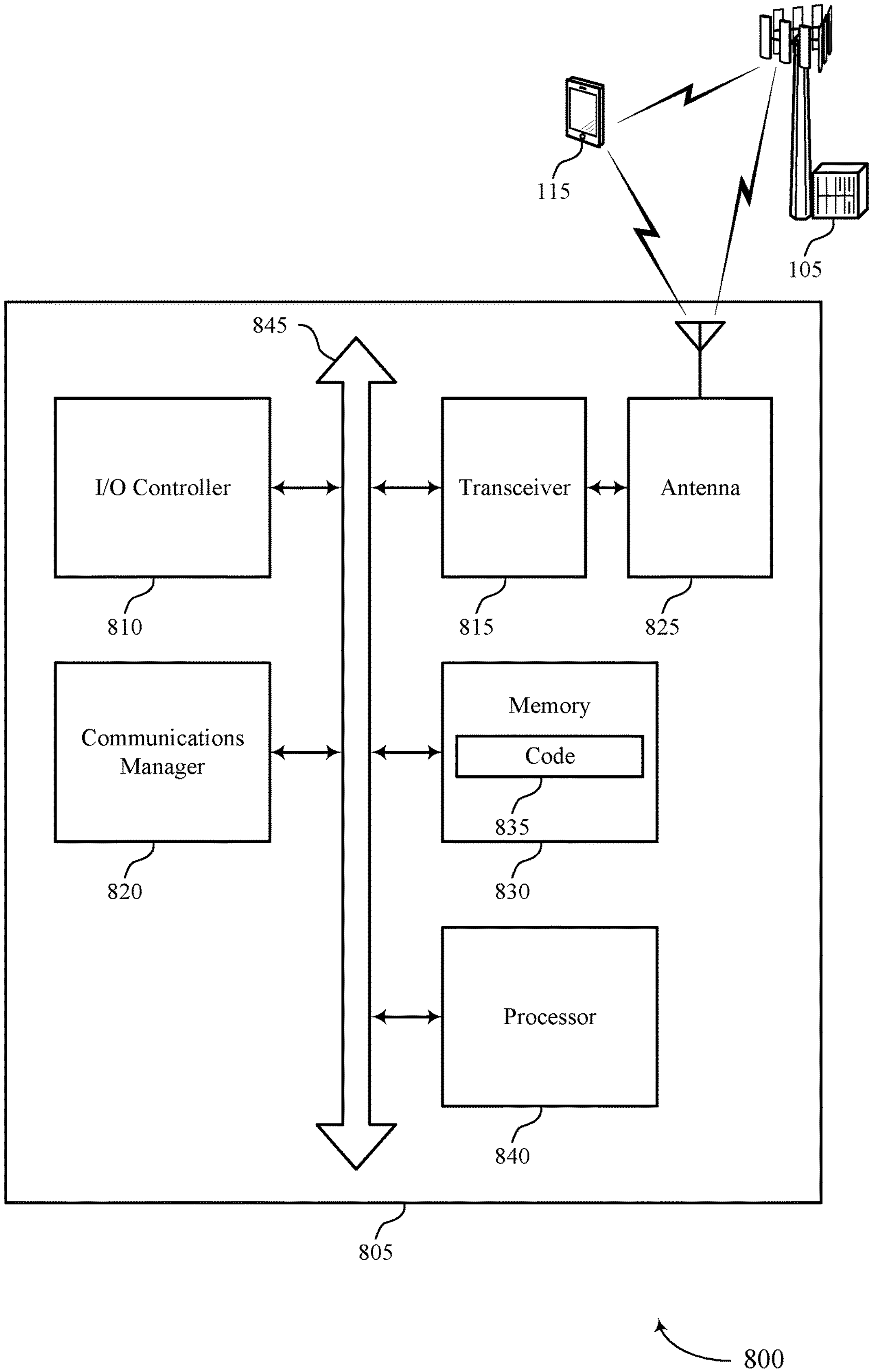
FIG. 8 shows a diagram of a system including a device that supports power increment control for dynamic random access adaptation in accordance with one or more aspects of the present disclosure.

FIG. 8 shows a diagram of a system 800 including a device 805 that supports power increment control for dynamic random access adaptation in accordance with one or more aspects of the present disclosure. The device 805 may be an example of or include components of a device 505, a device 605, or a UE 115 as described herein. The device 805 may communicate (e.g., wirelessly) with one or more other devices (e.g., network entities 105, UEs 115, or a combination thereof). The device 805 may include components for bi-directional voice and data communications including components for transmitting and receiving communications, such as a communications manager 820, an input/output (I/O) controller, such as an I/O controller 810, a transceiver 815, one or more antennas 825, at least one memory 830, code 835, and at least one processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of one or more processors, such as the at least one processor 840. In some cases, a user may interact with the device 805 via the I/O controller 810 or via hardware components controlled by the I/O controller 810.

In some cases, the device 805 may include a single antenna. However, in some other cases, the device 805 may have more than one antenna, which may be capable of concurrently transmitting or receiving multiple wireless transmissions. The transceiver 815 may communicate bi-directionally via the one or more antennas 825 using wired or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The at least one memory 830 may include random access memory (RAM) and read-only memory (ROM). The at least one memory 830 may store computer-readable, computer-executable, or processor-executable code, such as the code 835. The code 835 may include instructions that, when executed by the at least one processor 840, cause the device 805 to perform various functions described herein. The code 835 may be stored in a non-transitory computer-readable medium such as system memory or another type of memory. In some cases, the code 835 may not be directly executable by the at least one processor 840 but may cause a computer (e.g., when compiled and executed) to perform functions described herein. In some cases, the at least one memory 830 may include, among other things, a basic I/O system (BIOS) which may control basic hardware or software operation such as the interaction with peripheral components or devices.

The at least one processor 840 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 840 may be configured to operate a memory array using a memory controller. In some other cases, a memory controller may be integrated into the at least one processor 840. The at least one processor 840 may be configured to execute computer-readable instructions stored in a memory (e.g., the at least one memory 830) to cause the device 805 to perform various functions (e.g., functions or tasks supporting power increment control for dynamic random access adaptation). For example, the device 805 or a component of the device 805 may include at least one processor 840 and at least one memory 830 coupled with or to the at least one processor 840, the at least one processor 840 and the at least one memory 830 configured to perform various functions described herein.

In some examples, the at least one processor 840 may include multiple processors and the at least one memory 830 may include multiple memories. One or more of the multiple processors may be coupled with one or more of the multiple memories, which may, individually or collectively, be configured to perform various functions described herein. In some examples, the at least one processor 840 may be a component of a processing system, which may refer to a system (such as a series) of machines, circuitry (including, for example, one or both of processor circuitry (which may include the at least one processor 840) and memory circuitry (which may include the at least one memory 830)), or components, that receives or obtains inputs and processes the inputs to produce, generate, or obtain a set of outputs. The processing system may be configured to perform one or more of the functions described herein. For example, the at least one processor 840 or a processing system including the at least one processor 840 may be configured to, configurable to, or operable to cause the device 805 to perform one or more of the functions described herein. Further, as described herein, being "configured to," being "configurable to," and being "operable to" may be used interchangeably and may be associated with a capability, when executing code 835 (e.g., processor-executable code) stored in the at least one memory 830 or otherwise, to perform one or more of the functions described herein.

The communications manager 820 may support wireless communications in accordance with examples as disclosed herein. For example, the communications manager 820 is capable of, configured to, or operable to support a means for receiving a control message indicating a set of multiple random access occasions associated with a random access procedure. The communications manager 820 is capable of, configured to, or operable to support a means for receiving an indication to skip a quantity of one or more random access occasions of the set of multiple random access occasions. The communications manager 820 is capable of, configured to, or operable to support a means for transmitting a random access message during a random access occasion of the set of multiple random access occasions in accordance with a transmission power level, the transmission power level being based on the quantity of one or more skipped random access occasions.

By including or configuring the communications manager 820 in accordance with examples as described herein, the device 805 may support techniques for improved communication reliability, reduced latency, improved user experience related to reduced processing, reduced power consumption, more efficient utilization of communication resources, improved coordination between devices, longer battery life, and improved utilization of processing capability by enabling transmission power control based on skipped ROs, including same or dedicated counters, maximum counters limits, and increments for failed transmission power control and skipped RO power control.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the at least one processor 840, the at least one memory 830, the code 835, or any combination thereof. For example, the code 835 may include instructions executable by the at least one processor 840 to cause the device 805 to perform various aspects of power increment control for dynamic random access adaptation as described herein, or the at least one processor 840 and the at least one memory 830 may be otherwise configured to, individually or collectively, perform or support such operations.

Figure 9:
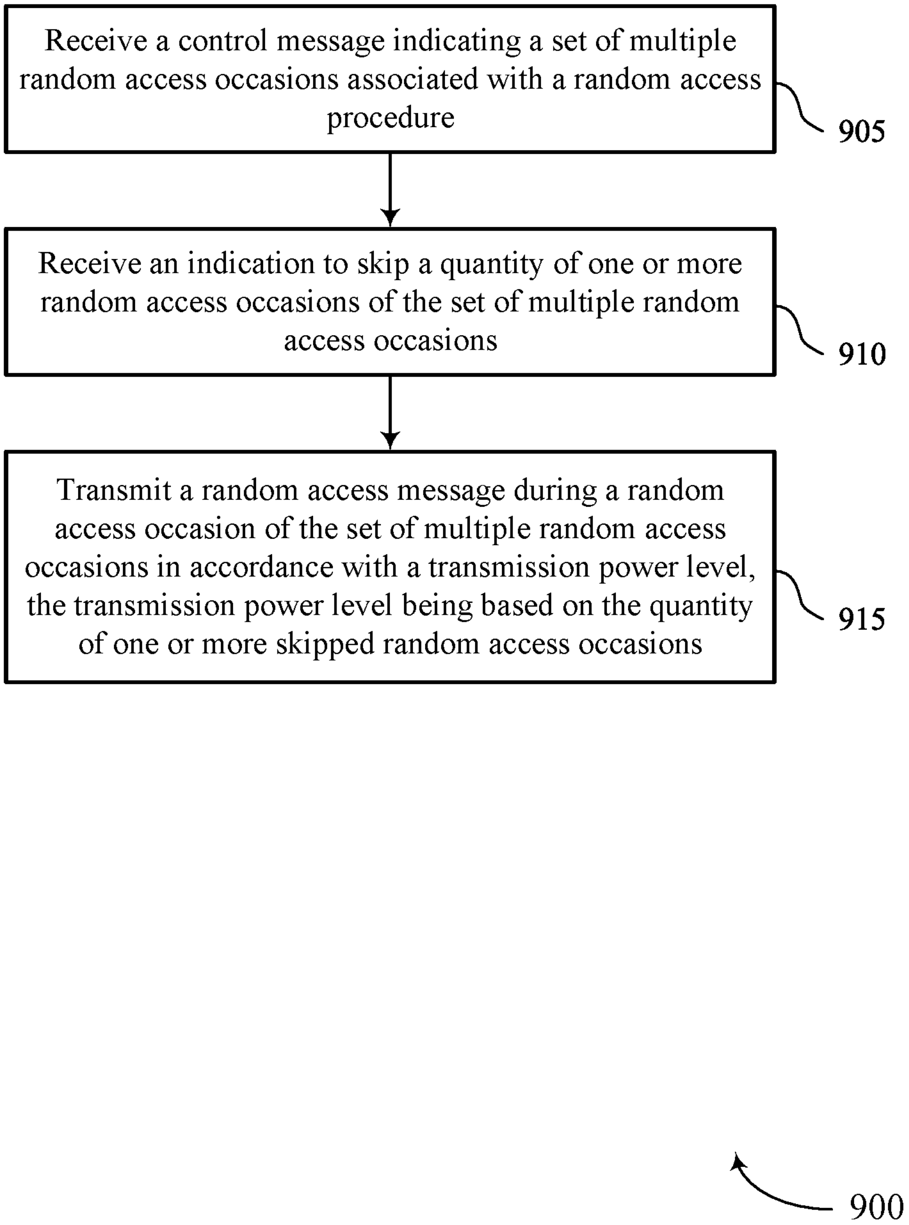
FIGS. 9 through 11 show flowcharts illustrating methods that support power increment control for dynamic random access adaptation in accordance with one or more aspects of the present disclosure.

FIG. 9 shows a flowchart illustrating a method 900 that supports power increment control for dynamic random access adaptation in accordance with one or more aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 905, the method may include receiving a control message indicating a set of multiple random access occasions associated with a random access procedure. The operations of 905 may be performed in accordance with examples as disclosed herein. In some examples, aspects of the operations of 905 may be performed by a control message component 725 as described with reference to FIG. 7.

At 910, the method may include receiving an indication to skip a quantity of one or more random access occasions of the set of multiple random access occasions. The operations of 910 may be performed in accordance with examples as disclosed herein. In some examples, aspects of the operations of 910 may be performed by an indication component 730 as described with reference to FIG. 7.

At 915, the method may include transmitting a random access message during a random access occasion of the set of multiple random access occasions in accordance with a transmission power level, the transmission power level being based on the quantity of one or more skipped random access occasions. The operations of 915 may be performed in accordance with examples as disclosed herein. In some examples, aspects of the operations of 915 may be performed by a random access message component 735 as described with reference to FIG. 7.

Figure 10:
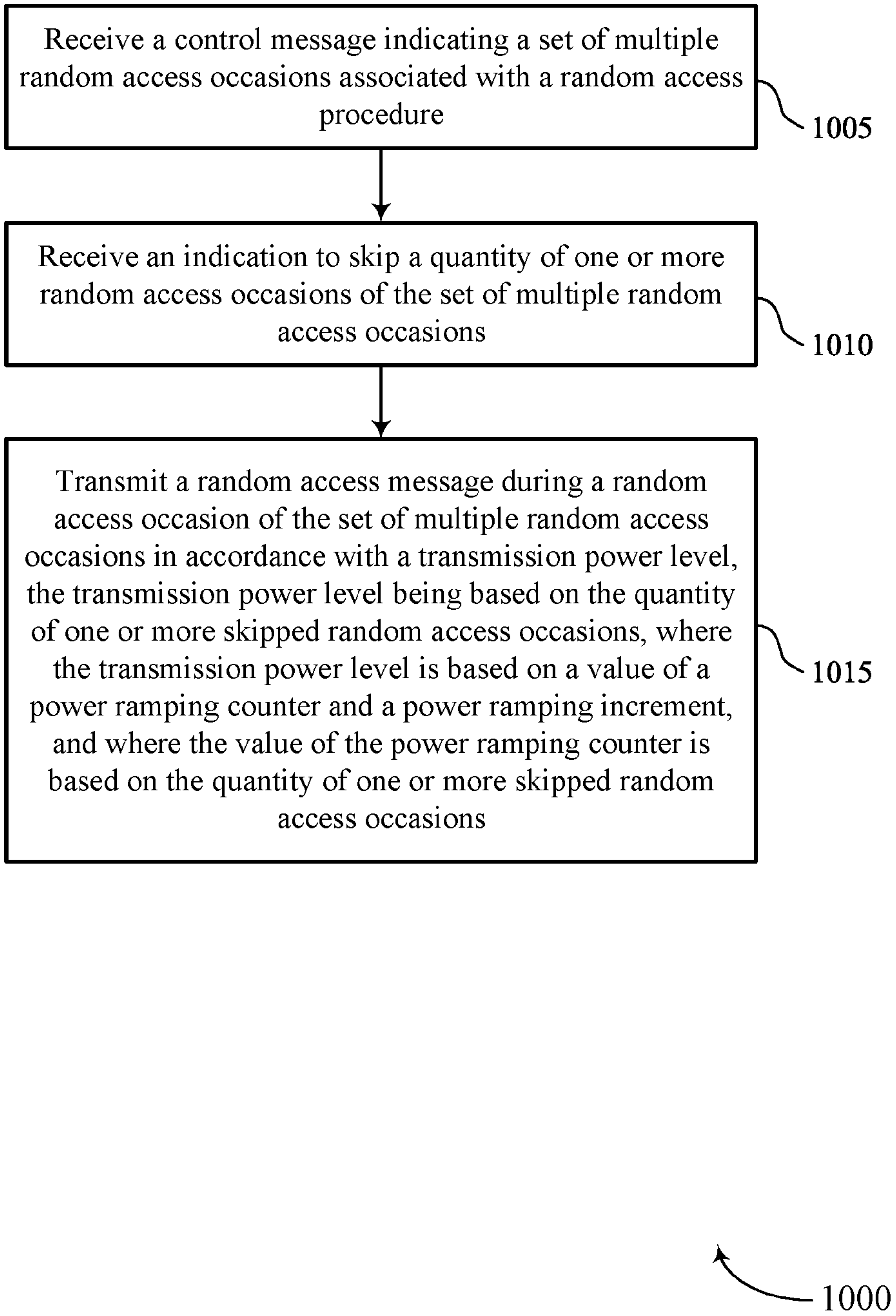

FIG. 10 shows a flowchart illustrating a method 1000 that supports power increment control for dynamic random access adaptation in accordance with one or more aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1005, the method may include receiving a control message indicating a set of multiple random access occasions associated with a random access procedure. The operations of 1005 may be performed in accordance with examples as disclosed herein. In some examples, aspects of the operations of 1005 may be performed by a control message component 725 as described with reference to FIG. 7.

At 1010, the method may include receiving an indication to skip a quantity of one or more random access occasions of the set of multiple random access occasions. The operations of 1010 may be performed in accordance with examples as disclosed herein. In some examples, aspects of the operations of 1010 may be performed by an indication component 730 as described with reference to FIG. 7.

At 1015, the method may include transmitting a random access message during a random access occasion of the set of multiple random access occasions in accordance with a transmission power level, the transmission power level being based on the quantity of one or more skipped random access occasions, where the transmission power level is based on a value of a power ramping counter and a power ramping increment, and where the value of the power ramping counter is based on the quantity of one or more skipped random access occasions. The operations of 1015 may be performed in accordance with examples as disclosed herein. In some examples, aspects of the operations of 1015 may be performed by a random access message component 735 as described with reference to FIG. 7.

Figure 11:
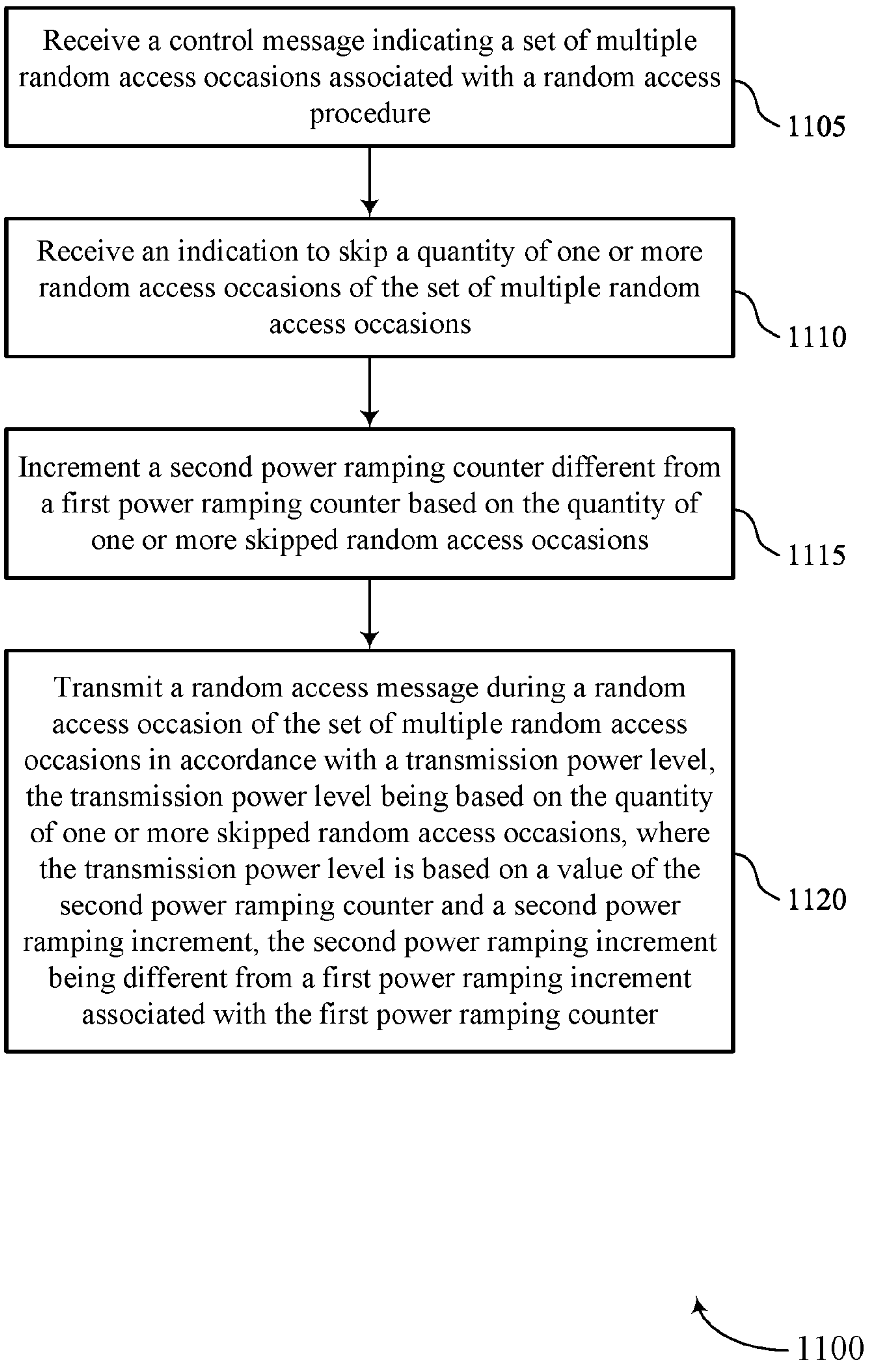

FIG. 11 shows a flowchart illustrating a method 1100 that supports power increment control for dynamic random access adaptation in accordance with one or more aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1105, the method may include receiving a control message indicating a set of multiple random access occasions associated with a random access procedure. The operations of 1105 may be performed in accordance with examples as disclosed herein. In some examples, aspects of the operations of 1105 may be performed by a control message component 725 as described with reference to FIG. 7.

At 1110, the method may include receiving an indication to skip a quantity of one or more random access occasions of the set of multiple random access occasions. The operations of 1110 may be performed in accordance with examples as disclosed herein. In some examples, aspects of the operations of 1110 may be performed by an indication component 730 as described with reference to FIG. 7.

At 1115, the method may include incrementing a second power ramping counter different from a first power ramping counter based on the quantity of one or more skipped random access occasions. The operations of 1115 may be performed in accordance with examples as disclosed herein. In some examples, aspects of the operations of 1115 may be performed by a counter component 740 as described with reference to FIG. 7.

At 1120, the method may include transmitting a random access message during a random access occasion of the set of multiple random access occasions in accordance with a transmission power level, the transmission power level being based on the quantity of one or more skipped random access occasions, where the transmission power level is based on a value of the second power ramping counter and a second power ramping increment, the second power ramping increment being different from a first power ramping increment associated with the first power ramping counter. The operations of 1120 may be performed in accordance with examples as disclosed herein. In some examples, aspects of the operations of 1120 may be performed by a random access message component 735 as described with reference to FIG. 7.

The following provides an overview of aspects of the present disclosure:

Aspect 1: A method for wireless communications by a UE, comprising: receiving a control message indicating a plurality of random access occasions associated with a random access procedure; receiving an indication to skip a quantity of one or more random access occasions of the plurality of random access occasions; and transmitting a random access message during a random access occasion of the plurality of random access occasions in accordance with a transmission power level, the transmission power level being based at least in part on the quantity of one or more skipped random access occasions.

Aspect 2: The method of aspect 1, wherein the transmission power level is based at least in part on a value of a power ramping counter and a power ramping increment, and the value of the power ramping counter is based at least in part on the quantity of one or more skipped random access occasions.

Aspect 3: The method of aspect 2, further comprising: receiving an indication of a defined counter value associated with the power ramping counter; and receiving an indication of the power ramping increment.

Aspect 4: The method of any of aspects 2 through 3, further comprising: terminating the random access procedure based at least in part on the value of the power ramping counter satisfying or exceeding a defined value.

Aspect 5: The method of any of aspects 2 through 4, further comprising: incrementing the power ramping counter based at least in part on the quantity of one or more skipped random access occasions.

Aspect 6: The method of any of aspects 1 through 5, further comprising: incrementing a second power ramping counter different from a first power ramping counter based at least in part on the quantity of one or more skipped random access occasions, wherein the transmission power level is based at least in part on a value of the second power ramping counter and a second power ramping increment, the second power ramping increment being different from a first power ramping increment associated with the first power ramping counter.

Aspect 7: The method of aspect 6, further comprising: receiving an indication of a first defined counter value associated with the first power ramping counter and a second defined counter value associated with the second power ramping counter; and receiving an indication of the first power ramping increment and the second power ramping increment.

Aspect 8: The method of any of aspects 6 through 7, further comprising: replacing a second value of the second power ramping counter with a defined value based at least in part on the second value of the second power ramping counter satisfying or exceeding the defined value.

Aspect 9: The method of any of aspects 1 through 8, wherein the transmission power level is greater than a previous transmission power level based at least in part on a transmission during a random access occasion being skipped.

Aspect 10: A UE for wireless communications, comprising one or more memories storing processor-executable code, and one or more processors coupled with the one or more memories and individually or collectively operable to execute the code to cause the UE to perform a method of any of aspects 1 through 9.

Aspect 11: A UE for wireless communications, comprising at least one means for performing a method of any of aspects 1 through 9.

Aspect 12: A non-transitory computer-readable medium storing code for wireless communications, the code comprising instructions executable by one or more processors to perform a method of any of aspects 1 through 9.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a graphics processing unit (GPU), a neural processing unit (NPU), an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:

one or more memories storing processor-executable code; and one or more processors coupled with the one or more memories and individually or collectively operable to execute the code to cause the UE to:

receive a control message indicating a plurality of random access occasions associated with a random access procedure;

receive an indication to skip a quantity of one or more random access occasions of the plurality of random access occasions; and transmit a random access message during a random access occasion of the plurality of random access occasions in accordance with a transmission power level, the transmission power level being based at least in part on the quantity of one or more skipped random access occasions.

2. The UE of claim 1, wherein:

the transmission power level is based at least in part on a value of a power ramping counter and a power ramping increment, and the value of the power ramping counter is based at least in part on the quantity of one or more skipped random access occasions.

3. The UE of claim 2, wherein the one or more processors are individually or collectively further operable to execute the code to cause the UE to:

receive an indication of a defined counter value associated with the power ramping counter; and receive an indication of the power ramping increment.

4. The UE of claim 2, wherein the one or more processors are individually or collectively further operable to execute the code to cause the UE to:

terminate the random access procedure based at least in part on the value of the power ramping counter satisfying or exceeding a defined value.

5. The UE of claim 2, wherein the one or more processors are individually or collectively further operable to execute the code to cause the UE to:

increment the power ramping counter based at least in part on the quantity of one or more skipped random access occasions.

6. The UE of claim 1, wherein the one or more processors are individually or collectively further operable to execute the code to cause the UE to:

increment a second power ramping counter different from a first power ramping counter based at least in part on the quantity of one or more skipped random access occasions, wherein the transmission power level is based at least in part on a value of the second power ramping counter and a second power ramping increment, the second power ramping increment being different from a first power ramping increment associated with the first power ramping counter.

7. The UE of claim 6, wherein the one or more processors are individually or collectively further operable to execute the code to cause the UE to:

receive an indication of a first defined counter value associated with the first power ramping counter and a second defined counter value associated with the second power ramping counter; and receive an indication of the first power ramping increment and the second power ramping increment.

8. The UE of claim 6, wherein the one or more processors are individually or collectively further operable to execute the code to cause the UE to:

replace a second value of the second power ramping counter with a defined value based at least in part on the second value of the second power ramping counter satisfying or exceeding the defined value.

9. The UE of claim 1, wherein the transmission power level is greater than a previous transmission power level based at least in part on a transmission during a random access occasion being skipped.

10. A method for wireless communications by a user equipment (UE), comprising:

receiving a control message indicating a plurality of random access occasions associated with a random access procedure;

receiving an indication to skip a quantity of one or more random access occasions of the plurality of random access occasions; and transmitting a random access message during a random access occasion of the plurality of random access occasions in accordance with a transmission power level, the transmission power level being based at least in part on the quantity of one or more skipped random access occasions.

11. The method of claim 10, wherein:

the transmission power level is based at least in part on a value of a power ramping counter and a power ramping increment, and the value of the power ramping counter is based at least in part on the quantity of one or more skipped random access occasions.

12. The method of claim 11, further comprising:

receiving an indication of a defined counter value associated with the power ramping counter; and receiving an indication of the power ramping increment.

13. The method of claim 11, further comprising:

terminating the random access procedure based at least in part on the value of the power ramping counter satisfying or exceeding a defined value.

14. The method of claim 11, further comprising:

incrementing the power ramping counter based at least in part on the quantity of one or more skipped random access occasions.

15. The method of claim 10, further comprising:

incrementing a second power ramping counter different from a first power ramping counter based at least in part on the quantity of one or more skipped random access occasions, wherein the transmission power level is based at least in part on a value of the second power ramping counter and a second power ramping increment, the second power ramping increment being different from a first power ramping increment associated with the first power ramping counter.

16. The method of claim 15, further comprising:

receiving an indication of a first defined counter value associated with the first power ramping counter and a second defined counter value associated with the second power ramping counter; and receiving an indication of the first power ramping increment and the second power ramping increment.

17. The method of claim 15, further comprising:

replacing a second value of the second power ramping counter with a defined value based at least in part on the second value of the second power ramping counter satisfying or exceeding the defined value.

18. A non-transitory computer-readable medium storing code for wireless communications, the code comprising instructions executable by one or more processors to:

receive a control message indicating a plurality of random access occasions associated with a random access procedure;

receive an indication to skip a quantity of one or more random access occasions of the plurality of random access occasions; and transmit a random access message during a random access occasion of the plurality of random access occasions in accordance with a transmission power level, the transmission power level being based at least in part on the quantity of one or more skipped random access occasions.

19. The non-transitory computer-readable medium of claim 18, wherein:

the transmission power level is based at least in part on a value of a power ramping counter and a power ramping increment, and the value of the power ramping counter is based at least in part on the quantity of one or more skipped random access occasions.

20. The non-transitory computer-readable medium of claim 18, wherein the instructions are further executable by the one or more processors to:

increment a second power ramping counter different from a first power ramping counter based at least in part on the quantity of one or more skipped random access occasions, wherein the transmission power level is based at least in part on a value of the second power ramping counter and a second power ramping increment, the second power ramping increment being different from a first power ramping increment associated with the first power ramping counter.

* * * * *